United States Patent [19]

Houpert et al.

[11] 3,776,777
[45] Dec. 4, 1973

[54] UNITARY ASSEMBLY OF SERIALLY CONNECTED FUEL CELLS

[75] Inventors: Bernd Houpert; Andreas Reich, both of Heidelberg, Germany

[73] Assignee: Brown, Boveri & Cie AG, Mannheim, Germany

[22] Filed: May 19, 1972

[21] Appl. No.: 255,060

[30] Foreign Application Priority Data
May 21, 1971 Germany.................. P 21 25 208.4

[52] U.S. Cl...................... 136/86 R, 136/6, 136/83
[51] Int. Cl. .......................................... H01m 27/16
[58] Field of Search ...................... 136/6 B, 6 R, 83, 136/86 R

[56] References Cited
UNITED STATES PATENTS
3,424,620  1/1969  Hughes et al. .................... 136/86 R
3,445,289  5/1969  Nervin et al. ...................... 136/86 R
3,451,911  6/1969  Tannenberger et al. .......... 136/86 R

*Primary Examiner*—A. B. Curtis
*Assistant Examiner*—H. A. Feeley
*Attorney*—David Toren et al.

[57] ABSTRACT

A unitary assembly of serially connected fuel cells is provided comprising a fuel cell electrolyte of solid material formed in two mating semi-cylindrical bodies, with the electrodes of the fuel cells arranged in a spiral pattern in opposed relationships on opposite sides of the electrolyte bodies. The semi-cylindrical bodies are joined together at abutment surfaces in a gas-tight relationship to form a cylinder through which a gaseous fuel flows, with the exterior of the cylinder being exposed to a gaseous oxidant. The electrodes extend across the abutment surfaces of the semi-cylinders, and when the semi-cylinders are assembled, selected electrodes are placed in electrical contact internally of the fuel cell assembly to effect series interconnection between the individual fuel cells of the assembly.

16 Claims, 6 Drawing Figures

UNITARY ASSEMBLY OF SERIALLY CONNECTED FUEL CELLS

BACKGROUND OF THE INVENTION

The invention relates to fuel cell structures comprising a solid or rigid electrolyte and electrodes arranged on opposite surfaces of the electrolyte, wherein a first electrode is exposed to a gaseous fuel and a second electrode is exposed to a gaseous oxidant to enable the fuel cell structure to operate as a direct current source. More particularly, the invention relates to a fuel cell assembly wherein a plurality of individual fuel cells may be connected in series internally of the assembly.

It has been previously known to provide, as sources of direct current, high temperature fuel cells having a thinwalled solid electrolyte of oxygen-ion conducting zirconium-dioxide $ZrO_2$ wherein an electron-conductive electrode is arranged on each surface of the electrolyte. In such a fuel cell structure, one electrode, i. e. the cathode, is supplied with a gaseous fuel comprising a hydrocarbon compound, and the other electrode, i. e. the anode, is exposed to a gaseous oxidant, e. g. atmospheric oxygen. In order to achieve a maximum electrochemical reaction between the fuel cell elements, and thus a higher efficiency, an operating temperature of over 800° C is selected for these fuel cells. Since the levels of power achieved with a single high temperature fuel cell is generally too low for certain applications, it becomes necessary to connect in series a great number of such fuel cells with up to 100 such serially connected fuel cells being required in some applications.

The individual fuel cells of such an assembly must be connected in a gas-tight relationship to enable appropriate flow of the reaction gases between adjacent fuel cells. Furthermore, electrically conductive contacts must be established between the anodes and the cathodes of adjacent cells.

In a known prior art embodiment of such a high temperature fuel cell, the individual fuel cells are designed as double disks, and individual disks of solid electrolyte having identical electrodes (cathodes) on their end faces are supported in facing relationship by column-type projections. The cavity thus formed between the facing disks is traversed by a reaction gas which is introduced from outside the cell structure. The end faces of the two disks facing away from each other which are provided with the other electrode type (anode) have a key shaped, non-metallized bead and are in gas-conductive relationship with each other through a bore. The individual double disks are superposed, and a regionally metallized sealing ring is arranged between the beads of two adjacent double disks. The metallized regions of the sealing rings thus establish a current-conductive connection between two conductors, of which a first conductor is secured on the outer shell of the double disk, starting from the cathode electrodes of each double disk, and a second conductor extends up to the inner bead starting from an anode electrode of the adjacent double disk. In this way, both an electric series connection of the individual cells and a separate gas flow pass for the anode and cathode electrodes is achieved. Since the hydrogen released from fuel gas is quite volatile at the high operating temperatures of over 800°C, being capable of penetrating steel plates of several centimeters in thickness, the sealing of such prior art high temperature fuel cells represents a rather difficult technical problem. The individual double disks are pressed together with high pressure by a tensioning device, but it has been found that a uniform contact pressure can only be achieved with a relatively small number of double disks and that, beyond a certain number of double disks, the ceramic solid electrolytes will break and develop leaks which will appear at the sealing rings due to the inhomogeneous pressure.

The problem sought to be overcome by the present invention relates to the provision, as direct current source, of a unitary assembly of a plurality of high temperature fuel cells connected in series, wherein the above described sealing difficulties are overcome and wherein a simplified overall construction may be effectively utilized.

SUMMARY OF THE INVENTION

Briefly, the present invention may be described as a fuel cell assembly comprising a solid electrolyte formed as a pair of semi-cylindrical members which are joined together along abutment surfaces. First and second electrodes are formed in a spiral arrangement on the inner and outer surfaces, respectively, on the electrolyte bodies, and a series connection between individual fuel cells is formed internally of the assembly by extending the electrodes to the abutment surfaces of the electrolyte semi-cylinders where electrical contact may be established between electrodes of the individual cells.

In a preferred embodiment of the invention, the abutment surfaces may be the axially extending edges of the semi-cylinders and they may be formed in a radial direction to lie in a plane extending through the axis of the electrolyte cylinder, i. e. they may be perpendicular to a tangent taken at the external surface of the cylinder. Alternatively, the abutment surfaces may extend in a non-radial direction being at an oblique angle to such a tangent. In another alternative embodiment, the abutment surfaces may be formed along the inner and outer surfaces of the semi-cylinders instead of at their edges, with the semi-cylinders being overlapped across a short surface distance near their edges.

The electrolyte semi-cylinders are joined together along their abutment surfaces to form a gas-tight seal. The seals may be formed either by welding with plasma or electron beams, or they may be formed by application of a sintered-on ceramic or vitreous layer. The sintered-on ceramic layer will preferably comprise a mixture of 45 parts by weight $SiO_2$, 32 parts by weight MgO and 23 parts by weight $Al_2O_e$. In another preferred embodiment, the sintered-on vitreous layer may comprise a mixture of 69 parts by weight $SiO_2$, 7 parts by weight $Al_2O_3$, 10 parts by weight $Na_2O$, 8 parts by weight CaO and 6 parts by weight $Li_2O$.

The cathode electrodes may consist of nickel or, alternatively, cobalt. The anode electrodes may consist preferably of a silver alloy or, alternatively, of a metal oxide comprising $SnO_2$ with 8 to 10 parts by weight $SbO_2$. Alternatively, $In_2O_3$ may be used as the metal oxide. Preferably, a mixture of 92 parts by weight $ZrO_2$, 4 parts by weight $Y_2O_3$ and 4 parts by weight $Yb_2O_3$ is used as the solid electrolyte.

The operating temperature of the fuel cells is preferably 1000°C and a hydrocarbon having the composition $C_3H_8$ mixed with steam is preferably used as the gaseous fuel. Other preferred alternatives for use as the gaseous fuel are: a hydrocarbon having the composition $C_3H_8$ mixed with carbon dioxide; a hydrocarbon having the composition $C_3H_8$ mixed with steam and carbon dioxide; natural gas; and hydrogen.

Atmospheric oxygen is preferably used as the gaseous oxidant.

An advantage of the fuel cell assembly of the present invention resides in the fact that a large number of serially connected high temperature fuel cells may be provided in a simplified unitary structure regardless of the number of cells involved merely by joining together in a gas-tight relationship a pair of semi-cylindrical electrolyte bodies with the number of cells to be provided being limited merely by the mechanical strength of the electrolyte semi-cylinders. Accordingly, the invention enables inclusion in a unitary assembly of a larger number of individual serially connected cells than was heretofore possible with prior art techniques. Furthermore, all of the electrolytes of the assembly may be applied to each electrolyte semi-cylinder in a single operation, e. g. by utilizing conventional masked plasma injection methods, thereby enhancing the speed and efficiency of the manufacturing procedures.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1b is a circuit diagram of the assembly represented in FIG. 1a;

DETAILED DESCRIPTION OF THE PREFERRED EMBODIMENTS

Figure 1A:
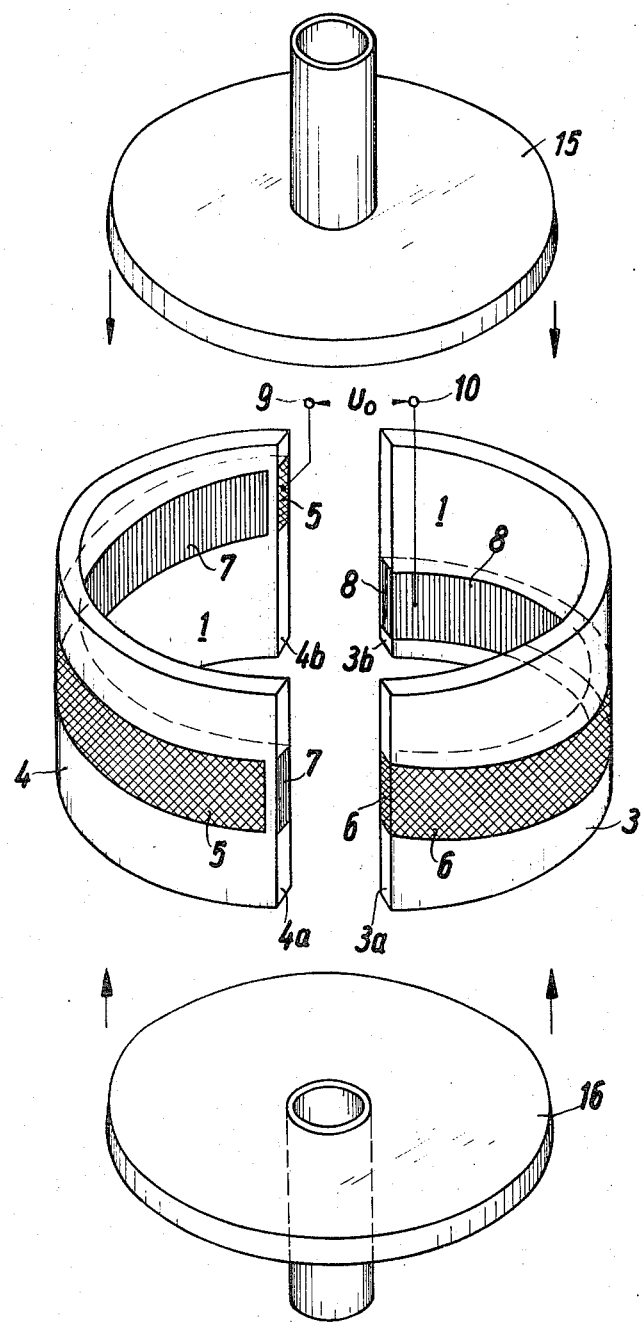
FIG. 1a is an exploded view in perspective showing a fuel cell assembly in accordance with the present invention comprising a pair of series-connected fuel cells.

FIG. 1a shows a fuel cell assembly in accordance with the present invention involving a pair of high temperature fuel cells and comprising a solid electrolyte 1 consisting of two semi-cylindrical electrolyte bodies 3 and 4 which are adapted to be placed in contact with each other along abutment surfaces formed along the axial edges of the electrolyte bodies. The abutment surfaces 3a, 3b and 4a, 4b may be respectively joined together by a welded joint provided along the outer surface of the cylinder which is formed by uniting the semi-cylinders 3 and 4. A pair of first electrodes 5 and 6 are spirally arranged on the outer surfaces of the semi-cylinders 4 and 3, respectively, and a pair of second electrodes 7 and 8 are similarly spirally arranged in a complementary fashion on the inner surfaces of said semi-cylinders, with each of said first electrodes being located in a directly opposed relationship with each of said second electrodes. In this manner, a fuel cell including electrodes 5 and 7 and a fuel cell including electrodes 6 and 8 is respectively formed on each semi-cylinder 4 and 3 with the individual fuel cells being electrically connected in series when the semi-cylinders are joined together. In this regard, it will be noted that the second electrode 7, a cathode of one of the fuel cells, extends from the inner surface of the semi-cylinder 4 across the abutment surface 4a, and that the first electrode 6, an anode of the other fuel cell, extends from the outer surface of the semi-cylinder 3 across the abutment surface 3a. Thus, an electrical connection will be formed between the electrodes 5 and 7 when the abutment surfaces 3a and 4a are joined together by assembly of the semi-cylinders 3 and 4. The other electrodes of the two fuel cells, i.e. electrodes 5 and 8, also extend from the outer and inner surfaces, respectively, of the semi-cylinders 4 and 3 across the abutment surfaces 4b and 3b, but as a result of the spiral arrangement of the electrodes no electrical contact is established between the electrodes 5 and 8 inasmuch as the portions of those electrodes which extend across the abutment surfaces 4b and 3b are axially spaced apart. As an additional safety measure, the ends of each of the electrodes opposite the ends which extend across the abutment surfaces are terminated at a short distance from the abutment surface closest thereto, thereby avoiding short-circuiting between the cells. For example, it will be noted that the ends of the electrode 5 which is closest to the abutment surface 4a is terminated a short distance from the abutment surface 4a thereby avoiding undesired contact with the electrodes 7, and with the electrode 6 when the semi-cylinders 3 and 4 are joined together.

The assembled cylinder which is formed when the semi-cylinders 3 and 4 are joined together is provided, at its upper end, with a feed pipe member 15 and, at its lower end, with a discharge pipe member 16. The fuel gas consisting of a hydrocarbon compound is introduced into the interior of the cylindrical fuel cell assembly through the feed pipe member 15 and is discharged through the discharge pipe member 16. The outer surface of the assembled cylinder comprising the semi-cylinders 3 and 4 is exposed to a gaseous oxidant, preferably atmospheric oxygen. The reagents flow from the outer and inner side of the assembled cylinder through the porous first and second electrodes to the solid electrolyte 1. Atmospheric oxygen is ionized by absorbing electrons and arrives as an ion $O^{2-}$ through the oxygen-ion conducting electrolyte at the opposite electrode where it reacts with the fuel, giving off electrons and forming electrons and water. The voltage $U_0$ formed between the electrodes 5 and 8 at the terminals 9 and 10 of the fuel cell assembly is obtained as the sum of the partial voltages of each of the fuel cells formed by the electrodes 5, 7 and 6,8.

Figure 1B:
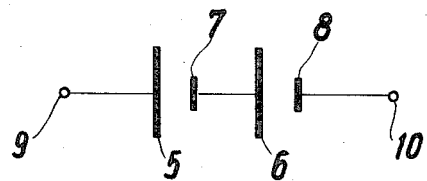

FIG. 1b shows an electric circuit diagram for the fuel cell assembly represented in FIG. 1a, with like reference numerals referring to similar elements in each of the figures. Solid electrolyte 1 located between each of the electrodes 5,7 and 6,8 of the individual fuel cells is indicated in FIG. 1b by the electrical separation shown between each of the electrodes. Furthermore, the electrical connection shown between the electrodes 6 and 7 in FIG. 1b represents the electrical contact which occurs between these electrodes at their end portions when the abutment surfaces 3a and 4a of the semi-cylinders 3 and 4 are brought together in the formation of the fuel cell assembly.

Although the assembly depicted in FIG. 1a comprises a pair of individual fuel cells, it will be understood that similar assemblies may be constructed in accordance with the present invention which will comprise a greater number of individual fuel cells. An example of such an assembly comprising a total of four individual fuel cells is depicted in FIG. 2a. The assembly of FIG. 2a is similarly formed with a solid electrolyte 1 and with a pair of semi-cylinders 3 and 4 which are joined together at their abutment surfaces 3a, 4a, and 3b, 4b, respectively. Each of the semi-cylinders 3 and 4 has a pair of fuel cells formed thereon, with an individual fuel cell being formed to comprise each of the electrode pairs 5–7, 6–8, 11–13 and 12–14. The electrodes of the assembly of FIG. 2a are formed in a spiral arrangement around the semi-cylinders 3 and 4 in a manner similar to that depicted in FIG. 1a. Thus, particular ends of the electrodes may be selectively brought into electrical contact by joining together of the semi-cylinders, while other ends of the electrodes where no electrical contact is desired may be maintained apart. Each of the electrodes in FIG. 2a comprises an end which extends across one of the abutment surfaces 3a, 3b, 4a, or 4b and an opposite end which terminates a small distance away from the abutment surface closest thereto. Thus, when the semi-cylinders 3 and 4 are assembled with their abutment surfaces in contact, the ends of the electrodes 6 and 7 which extend across the abutment surfaces 3a and 4a, respectively, will be brought into electrical contact. Similarly, the ends of the electrodes 8 and 11 which extend across the abutment surfaces 3b and 4b, respectively, will be brought into electrical contact thereby forming a series-connection between the cells comprising the electrodes 8 and 11. Another series-connection between adjacent fuel cells is established when the ends of the electrodes 12 and 13 which extend across the abutment surfaces 3a and 4a, respectively, are brought into contact in a manner similar to that which occurs with the other electrodes previously mentioned. Because of the spiral arrangement of the electrodes, the ends of the electrodes 5 and 14 which extend across the abutment surfaces 4b and 3b, respectively, are maintained out of contact with each other and an external electrical tap for the fuel cell assembly may be provided by connecting the terminals 9 and 10 to the spaced ends of the electrodes.

Figure 2C:
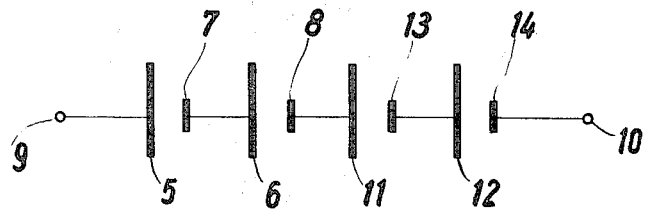
FIG. 2c is a circuit diagram of the assembly shown in FIGS. 2a and 2b.
Figure 2A:
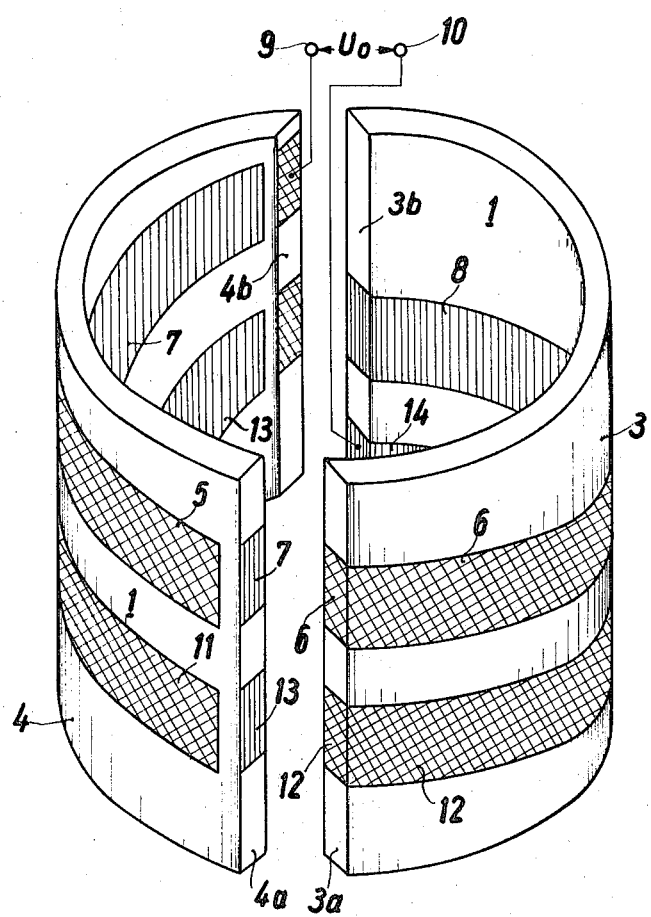
FIG. 2a is a perspective view of portions of a fuel cell assembly comprising four series-connected fuel cells shown prior to their assembly.
Figure 2B:
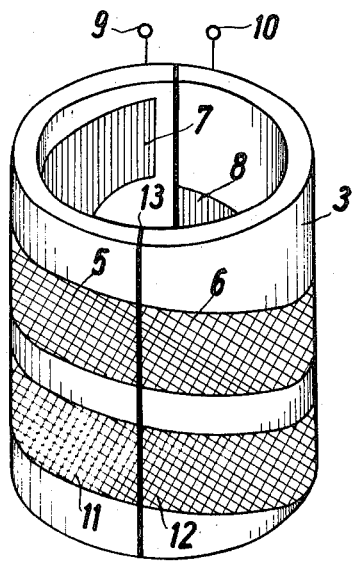
FIG. 2b is a perspective view showing the portions of FIG. 2a in the assembled state.

The fuel cell assembly, which is shown in its disassembled condition in FIG. 2a, is represented in the assembled assembled state in FIG. 2b. As shown therein, the two semi-cylinders 3 and 4 are joined together by connecting seams which extend along the edges of the abutment surfaces 3a, 3b, 4a and 4b. These seams may be formed either by welding or by applying a ceramic or vitreous sintered layer along the abutment surface edges. An example of a ceramic material which may be used for the seam may comprise a mixture of 45 parts by weight $SiO_2$, 32 parts by weight MgO and 23 parts by weight $Al_2O_3$. An example of a vitreous material which may be used in forming the seam comprises a mixture of 69 parts by weight $SiO_2$, 7 parts by weight $Al_2O_3$, 10 parts by weight $Na_2O$, 8 parts by weight CaO and 6 parts by weight $Li_2O$.

FIG. 2c shows a circuit diagram of the fuel cell assembly of FIGS. 2a and 2b, utilizing like reference numerals for similar elements of the assembly. As shown in FIG. 2c, four individual fuel cells are provided with an individual fuel cell being represented by each of the electrode pairs 5–7, 6–8, 11–13 and 12–14, and with the total external voltage $U_o$ of the assembly being derived across the terminals 9 and 10 connected form the electrodes 5 and 14.

Figure 3:
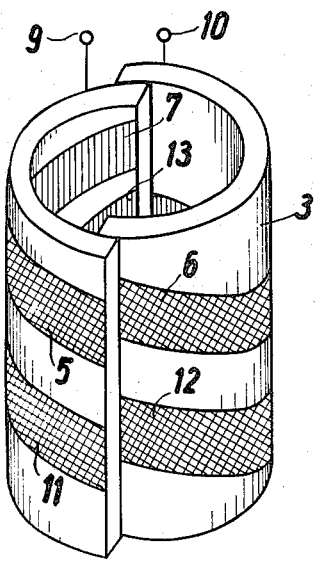
FIG. 3 is a perspective view showing an alternative technique for joining a fuel cell assembly according to the invention comprising four series-connected fuel cells.

FIG. 3 shows an additional embodiment of the fuel cell assembly of the present invention which comprises a total of four series-connected fuel cells. In the embodiment represented in FIG. 3, the semi-cylinders 3 and 4 are joined together by overlapping their inner and outer respective surfaces, rather than by abutment of the axially extending edges of the semi-cylinders as in the case of the previously described embodiments. It will be apparent that by overlapping the semi-cylinders in the manner depicted in FIG. 3 there will occur electrical interconnections between the individual electrodes which are electrically identical to the connections formed with the embodiment of FIG. 2b. Thus, the circuit diagram of FIG. 2c corresponds electrically with the assembly shown in FIG. 3 as well as with the assembly of FIG. 2b. Thus, the embodiment of FIG. 3 will be electrically similar to the embodiment of FIG. 2b but will be structurally dissimilar with regard to the manner by which the semi-cylinders 3 and 4 are joined together. In joining the semi-cylinders of FIG. 3, a connection similar to those previously described may be formed by application along the edges of the abutting surfaces of seams comprising suitable sintered ceramic or vitreous material.

In a specific embodiment arranged in the manner shown in FIG. 3, a solid electrolyte comprising zirconium dioxide with 4 percent by weight each of yttrium oxide $Y_2O_3$ and ytterbium oxide $Yb_2O_3$ was utilized. The powdered solid electrolyte constituents were formed by being pressed and sintered into semi-cylindrical shapes having a radius of 5 mm, a wall thickness of 0.5 mm, and a length of 50 cm. Layers of first electrodes consisting of a silver alloy were applied in a spiral arrangement on the outer surface of the semi-cylinders, with the electrode layers having a thickness of 0.1 mm and spaced apart an axial distance of 3 mm. On the inner surface of the semi-cylinders there were applied an equivalent number of second electrodes consisting of nickel having a thickness of 0.1 mm and arranged in a directly opposed relationship to the first electrodes. The semi-cylinders were subsequently joined along the edges of their abutting surfaces by sintering-on a ceramic material of 45 parts by weight silicon oxide $SiO_2$, 32 parts by weight magnesium oxide MgO and 23 parts by weight aluminum oxide $Al_2O_3$. A steam-enriched propane gas $C_3H_8$ was passed through the interior of the fuel cell assembly thus produced, and the outer side of the assembly was exposed to atmospheric air. After heating to an operating temperatures of 1000°C, a measured electrical power output of 75 watts was derived from the assembly. The internal resistance of the assembly formed in accordance with the present invention was found to be lower by one order of magnitude as compared with prior art comparable high temperature fuel cell assemblies of the disk type and it is believed that this result was derived due to the smaller wall thicknesses of 0.5 mm.

While specific embodiments of the invention have been shown and described in detail to illustrate the application of the inventive principles, it will be understood that the invention may be embodied otherwise without departing from such principles.

What is claimed is:

1. In a fuel cell assembly comprising a plurality of electrically serially-connected fuel cells including a solid electrolyte, first electrodes exposed to a fluid fuel and second electrodes exposed to a fluid oxidant, the improvement wherein said solid electrolyte is formed as a pair of semi-cylindrical members each having complementary abutment surfaces along which said members are joined in fluid-tight relationship, and wherein said first and second electrodes are formed in opposed relationship on opposite sides, respectively, of said semi-cylindrical members in a spiral configuration with first and second electrodes of adjacent fuel cells extending to and being in electrical contact at said abutment surfaces.

2. A fuel cell assembly according to claim 1, wherein said abutment surfaces comprise axially extending edge surfaces of said semi-cylindrical members and wherein said electrodes each include a pair of terminal ends, with the terminal ends of electrodes at which the electrical contact is to be made extending to and along portions of an abutment surface, and with terminal ends at which no electrical contact is to be made being spaced a distance from an abutment surface.

3. A fuel cell assembly according to claim 1 wherein said semi-cylindrical members when joined together form a unitary cylindrical member, and wherein said abutment surfaces extend axially of said cylindrical member and lie in a plane which passes through and includes the axis of said cylindrical member.

4. A fuel cell assembly according to claim 1, wherein said semi-cylindrical members when joined together form a unitary cylindrical member, and wherein said abutment surfaces extend axially of said cylindrical member and lie in a plane which does not pass through the axis of said cylindrical member.

5. A fuel cell assembly according to claim 1, wherein said semi-cylindrical members include axially extending edge portions and wherein said abutment surfaces are formed by overlapping said semi-cylindrical members along cylindrical surface portions thereof adjoining said edge portions, with said electrodes to be placed in electrical contact extending at least to said edge portions.

6. A fuel cell assembly according to claim 1, wherein said semi-cylindrical members are joined together by welded joints formed along the edges of said abutment surfaces.

7. A fuel cell assembly according to claim 1, wherein said semi-cylindrical members are joined together by a seam comprising sintered ceramic material extending along the edges of said abutment surfaces.

8. A fuel cell assembly according to claim 7, wherein said sintered ceramic material comprises a mixture of 45 parts by weight $SiO_2$, 32 parts by weight MgO and 23 parts by weight $Al_2O_3$.

9. A fuel cell assembly according to claim 1 wherein said semi-cylindrical members are joined together by a seam extending along the edges of said abutment surfaces and consisting of sintered vitreous material comprising a mixture of 69 parts by weight $SiO_2$, 7 parts by weight $Al_2O_3$, 10 parts by weight CaO and 6 parts by weight $Li_2O$.

10. A fuel cell assembly according to claim 1, wherein said first electrodes comprise nickel.

11. A fuel cell assembly according to claim 1, wherein said first electrodes comprise cobalt.

12. A fuel cell assembly according to claim 1, wherein said second electrodes comprise a silver alloy.

13. A fuel cell assembly according to claim 1, wherein said second electrodes comprise a metal oxide.

14. A fuel cell assembly according to claim 13, wherein said metal oxide comprises $SnO_2$ and 8 to 30 parts by weight $Sb_2O_3$.

15. A fuel cell assembly according to claim 13, wherein said metal oxide comprises $In_2O_3$.

16. A fuel cell assembly according to claim 1, wherein said solid electrolyte comprises a mixture of 92 parts by weight $CrO_2$, 4 parts by weight $Y_2O_3$ and 4 parts by weight $Yb_2O_3$.

* * * * *